(12) United States Patent
Cui et al.

(10) Patent No.: US 12,425,535 B2
(45) Date of Patent: Sep. 23, 2025

(54) VIDEO PROCESSING METHOD AND APPARATUS, ELECTRONIC DEVICE, AND STORAGE MEDIUM

(71) Applicant: HONOR DEVICE CO., LTD., Guangdong (CN)

(72) Inventors: Hantao Cui, Shenzhen (CN); Weilong Hou, Shenzhen (CN); Guoqiao Chen, Shenzhen (CN); Yu Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/262,809

(22) PCT Filed: May 24, 2022

(86) PCT No.: PCT/CN2022/094773
§ 371 (c)(1),
(2) Date: Jul. 25, 2023

(87) PCT Pub. No.: WO2023/016041
PCT Pub. Date: Feb. 16, 2023

(65) Prior Publication Data
US 2024/0073360 A1 Feb. 29, 2024

(30) Foreign Application Priority Data
Aug. 12, 2021 (CN) .......................... 202110926946.0

(51) Int. Cl.
*H04N 7/01* (2006.01)
*G06T 5/50* (2006.01)
(Continued)

(52) U.S. Cl.
CPC ............. *H04N 7/0117* (2013.01); *G06T 5/50* (2013.01); *G06T 7/20* (2013.01); *H04N 5/265* (2013.01);
(Continued)

(58) Field of Classification Search
None
See application file for complete search history.

(56) References Cited

U.S. PATENT DOCUMENTS

| 7,847,827 B2 | 12/2010 | Shin |
| 9,338,349 B2 * | 5/2016 | Sharma ................ H04N 23/958 |

(Continued)

FOREIGN PATENT DOCUMENTS

| CN | 101163221 A | 4/2008 |
| CN | 102572451 A | 7/2012 |

(Continued)

OTHER PUBLICATIONS

Hongbin Zhang; "Adaptive Imaging Control System Based on Traffic Video Analysis"; Journal of Southwest Jiaotong University; May 31, 2018; 8 pages (with English abstract).

*Primary Examiner* — James M Hannett

(57) ABSTRACT

Embodiments of this application relate to the technical field of video shooting, and provide a video processing method and apparatus, an electronic device, and a storage medium. The video processing method includes: determining one video storage resolution; determining one video style template; obtaining a video shot through a camera lens; snapping a corresponding image in the video as a snapped image in response to a snapping instruction; processing the video by using a LOG curve; processing the snapped image by using the LOG curve; converting a LOG video into a determined video storage resolution if the determined video storage resolution is less than a preset resolution, and processing the LOG video based on a LUT; and processing (Continued)

a LOG-based snapped image based on the LUT, where a resolution of the snapped image is equal to the preset resolution.

13 Claims, 10 Drawing Sheets

(51) Int. Cl.
  *G06T 7/20* (2017.01)
  *H04N 5/265* (2006.01)
  *H04N 23/951* (2023.01)

(52) U.S. Cl.
  CPC . *H04N 23/951* (2023.01); *G06T 2207/20221* (2013.01)

(56) References Cited

U.S. PATENT DOCUMENTS

| | | |
|---|---|---|
| 2010/0158366 A1 | 6/2010 | Brown |
| 2013/0083212 A1 | 4/2013 | Baek et al. |
| 2014/0307960 A1 | 10/2014 | Sharma et al. |
| 2014/0358005 A1* | 12/2014 | Hiriyannaiah ........ B06B 1/0215 600/447 |
| 2019/0052790 A1 | 2/2019 | Kang et al. |

FOREIGN PATENT DOCUMENTS

| | | |
|---|---|---|
| CN | 105578014 A | 5/2016 |
| CN | 109688340 A | 4/2019 |
| CN | 110121882 A | 8/2019 |
| CN | 111510698 A | 8/2020 |
| CN | 111698388 A | 9/2020 |
| CN | 111970440 A | 11/2020 |
| CN | 112767295 A | 5/2021 |
| CN | 113810642 A | 12/2021 |
| JP | 2005284168 A | 10/2005 |
| WO | 2011019101 A1 | 2/2011 |

* cited by examiner

VIDEO PROCESSING METHOD AND APPARATUS, ELECTRONIC DEVICE, AND STORAGE MEDIUM

CROSS-REFERENCE TO RELATED APPLICATIONS

This application is a national stage of International Application No. PCT/CN2022/094773, filed on May 24, 2022, which claims priority to Chinese Patent Application No. 202110926946.0, filed on Aug. 12, 2021. The disclosures of both of the aforementioned applications are hereby incorporated by reference in their entireties.

TECHNICAL FIELD

This application relates to the technical field of video shooting, and in particular to a video processing method and apparatus, an electronic device, and a storage medium.

BACKGROUND

With the development of technologies, users have increasingly high requirements for effects and styles of videos shot through terminals such as mobile phones. However, in a current mobile phone, a filter principle in a shooting mode is usually used for a tilter used to capture a video, and a video processed by the filter cannot meet a high color grading requirement.

SUMMARY

A video processing method and apparatus, an electronic device, and a storage medium are provided, to enable a video shot through the electronic device to present a different style effect based on a characteristic of a LUT, meeting a higher color grading requirement.

According to a first aspect, a video processing method is provided. The method includes: determining one video storage resolution from a plurality of video storage resolutions; determining one video style template among a plurality of video style templates, where each video style template is corresponding to a preset look up table LUT; obtaining a video shot through a camera, where the video is corresponding to a preset resolution; snapping a corresponding image in the video as a snapped image in response to a snapping instruction; processing the video by using a logarithm LOG curve corresponding to a current photosensitivity ISO of the camera, to obtain a LOG video; processing the snapped image by using the LOG curve corresponding to the current ISO of the camera, to obtain a LOG-based snapped image; converting the LOG video from the preset resolution to a determined video storage resolution if the determined video storage resolution is less than the preset resolution, and processing the LOG video based on a LUT corresponding to the determined video style template, to obtain a video corresponding to the determined video style template; and processing the LOG-based snapped image based on the LUT corresponding to the determined video style template, to obtain a snapped image corresponding to the determined video style template, where a resolution of the snapped image is equal to the preset resolution.

In a possible implementation, the video processing method further includes: processing the LOG video based on the LUT corresponding to the determined video style template if the determined video storage resolution is equal to the preset resolution, to obtain the video corresponding to the determined video style template.

In a possible implementation, the obtaining a video shot through a camera includes: alternately obtaining a video image of a first exposure frame and a video image of a second exposure frame, where a time for which the video image of a first exposure frame is exposed is greater than a time for which the video image of a second exposure frame is exposed; a process of snapping a corresponding image in the video as a snapped image in response to a snapping instruction includes: using the video image of a second exposure frame as a reference frame if a moving object is detected in a current video; or using the video image of a first exposure frame as a reference frame if no moving object is detected in a current video; and fusing a plurality of frames of video images into the snapped image based on the reference frame. In a moving scene, the time for which the video image of a second exposure frame is exposed is short, and the video image of a second exposure frame is fused as the reference frame, to reduce a smearing phenomenon. In a still scene, the time for which the video image of a first exposure frame is long, and the video image of a first exposure frame is fused as the reference frame, to enable imaging quality of a still image to be better.

In a possible implementation, before a process of processing the LOG-based snapped image based on a LUT corresponding to the determined video style template, to obtain a snapped image corresponding to the determined video style template, the method further includes: converting the LOG-based snapped image from 10-bit image data to 8-bit image data. In this way, a bit depth may be adapted to a common picture format. In another possible implementation, if a picture format stored for the snapped image supports 10 bit, conversion may not be required.

In a possible implementation, in a first video processing procedure, a process of processing the video by using a logarithm LOG curve corresponding to a current photosensitivity ISO of the camera, to obtain a LOG video, and a process of processing the LOG video based on a LUT corresponding to the determined video style template, to obtain a video corresponding to the determined video style template are performed. The video processing method further includes a second video processing procedure. The second video processing procedure includes: processing the video shot through the camera by using a logarithm LOG curve, to obtain a LOG video; and processing the LOG video based on a LUT corresponding to the determined video style template, to obtain a video corresponding to the determined video style template. The video processing method further includes: storing the video corresponding to the determined video style template in the first video processing procedure; and previewing the video corresponding to the determined video style template in the second video processing procedure. This can enable a previewed video and a finally obtained video to have a same visual effect, to help a user preview a video based on a style after color grading.

In a possible implementation, a video resolution in the second video processing procedure is less than a resolution of the snapped image.

According to a second aspect, a video processing apparatus is provided. The video processing apparatus includes: a processor and a memory. The memory is configured to store at least one instruction. The instruction is loaded and executed by the processor to implement the foregoing video processing method.

According to a third aspect, an electronic device is provided. The electronic device includes: a camera and the foregoing video processing apparatus.

According to a fourth aspect, a computer-readable storage medium is provided. The computer-readable storage medium stores a computer program. When the computer program is run on a computer, the computer is enabled to perform the foregoing video processing method.

In the video processing method and apparatus, the electronic device, and the storage medium in the embodiments of this application, during video recording, the LOG video is processed by using a LUT technology in a movie industry and based on the LUT corresponding to the determined video style template. This enables a recorded video to have a style effect corresponding to the determined video style template, to meet a high color grading requirement, and enables the recorded video to have movie quality. In addition, the snapped image is processed based on the LOG curve and the LUT, to obtain a snapped image with details kept and with a tone similar to a tone corresponding to the video style template. The snapped image is always processed at the preset resolution. In this way, even if the video storage resolution is low, a snapped image with a high resolution may be obtained by snapping, to ensure that the snapped image has high definition.

DESCRIPTION OF EMBODIMENTS

Terms used in implementations of this application are merely intended to explain specific embodiments of this application, but are not intended to limit this application.

Figure 1:
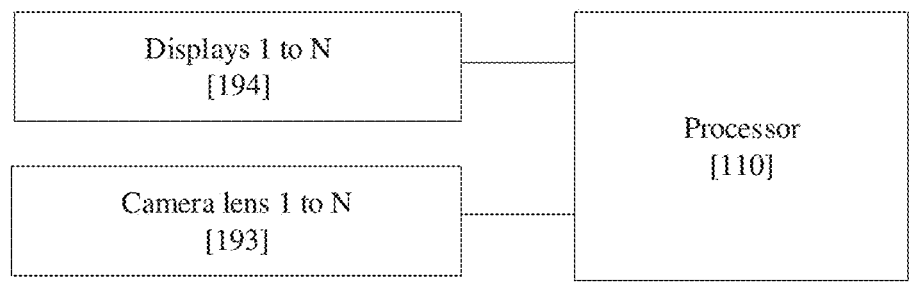
FIG. 1 is a block diagram of a structure of an electronic device according to an embodiment of this application.

Before introducing embodiments of this application, an electronic device in the embodiments of this application is first described. As shown in FIG. 1, the electronic device 100 may include a processor 110, camera 193, displays 194, and the like. It may be understood that a structure shown in this embodiment of the present invention does not constitute a specific limitation on the electronic device 100. In some other embodiments of this application, the electronic device 100 may include more or fewer components than those shown in the figure, combine some components, split some components, or have a different component arrangement. The components shown in the figure may be implemented in hardware, software, or a combination of software and hardware.

The processor 110 may include one or more processing units. For example, the processor 110 may include a graphics processing unit (graphics processing unit, GPU), an image signal processor (image signal processor, ISP), a controller, a video codec, a digital signal processor (digital signal processor, DSP), and the like. Different processing units may be separate devices or may be integrated into one or more processors. The controller may generate an operation control signal based on instruction operation code and a time sequence signal, to complete control of instruction fetching and instruction execution. A memory may be further disposed in the processor 110 and is configured to store instructions and data.

The electronic device 100 implements a display function by using the GPU, the displays 194, an application processor, and the like. The GPU is a microprocessor for image processing and is connected to the displays 194 and the application processor. The GPU is configured to perform mathematical and geometric computation and render a graph. The processor 110 may include one or more GPUs and execute program instructions to generate or change display information.

The electronic device 100 may implement a shooting function by using the ISP, the camera 193, the video codec, the GPU, the displays 194, the application processor, and the like.

The ISP is configured to process data fed back by the camera 193. For example, during shooting, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, luminance, and complexion of the image. The ISP may further optimize parameters such as exposure and a color temperature in a shooting scene. In some embodiments, the ISP may be disposed in the camera 193.

The camera 193 is configured to capture a still image or a video. An optical image of an object is generated through the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into the electrical signal and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N camera 193, where N is a positive integer greater than 1.

The digital signal processor is configured to process a digital signal and may process another digital signal in addition to the digital image signal. For example, when the electronic device 100 selects a frequency, the digital signal processor is configured to perform Fourier transformation or the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)1, MPEG2, MPEG3, and MPEG4.

Figure 2:
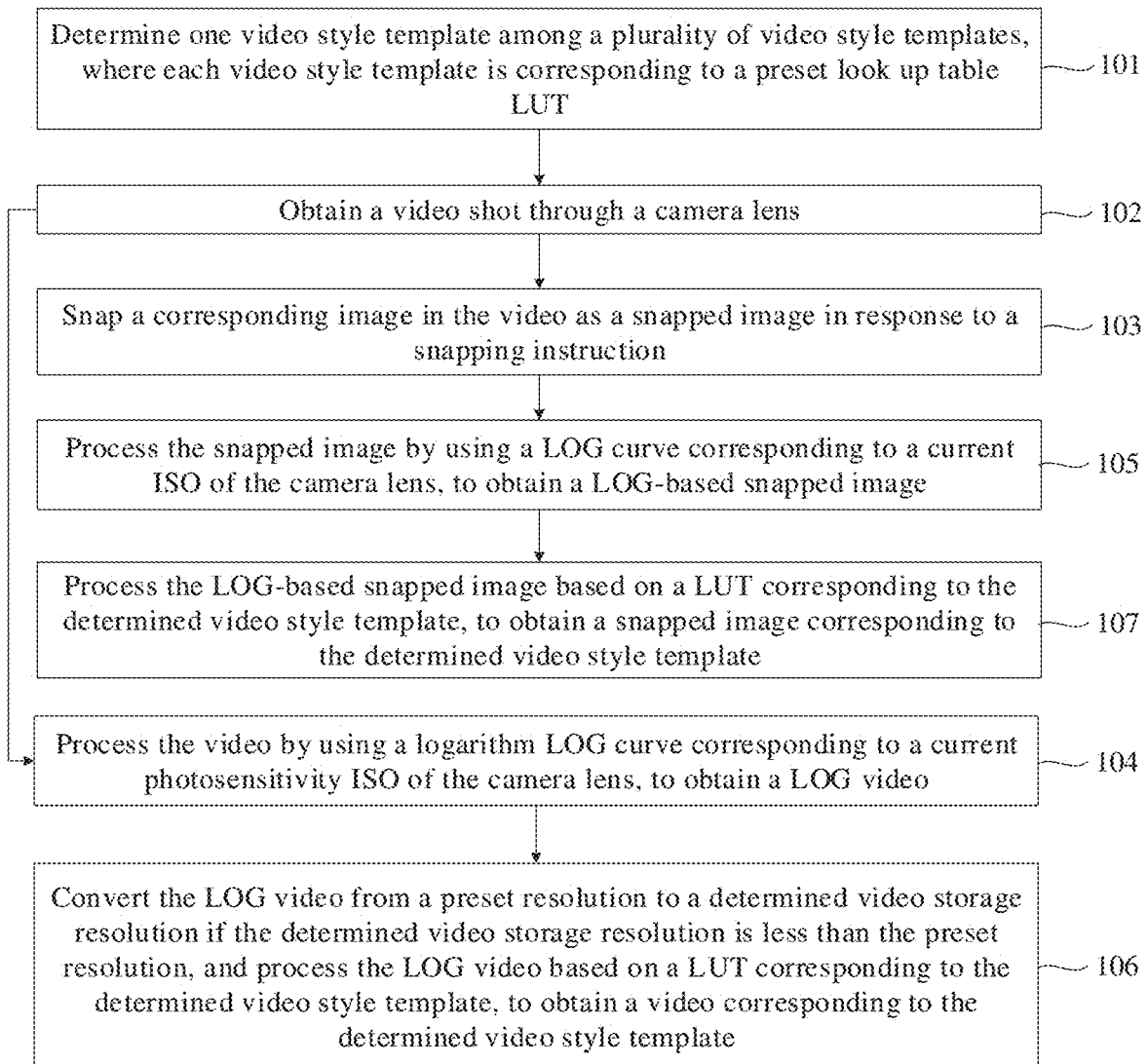
FIG. 2 is a flowchart of a video processing method according to an embodiment of this application.

As shown in FIG. 2, an embodiment of this application provides a video processing method. The video processing method may be performed by a processor 110, that is, an ISP or a combination of the ISP and another processor. The video processing method includes the following steps.

Step 100: Determine one video storage resolution from a plurality of video storage resolutions, where the determined video storage resolution is a resolution of a video file obtained after video recording is completed.

Step 101: Determine one video style template among a plurality of video style templates, where each video style template is corresponding to a preset look up table (Look Up Table, LUT).

Figure 3:
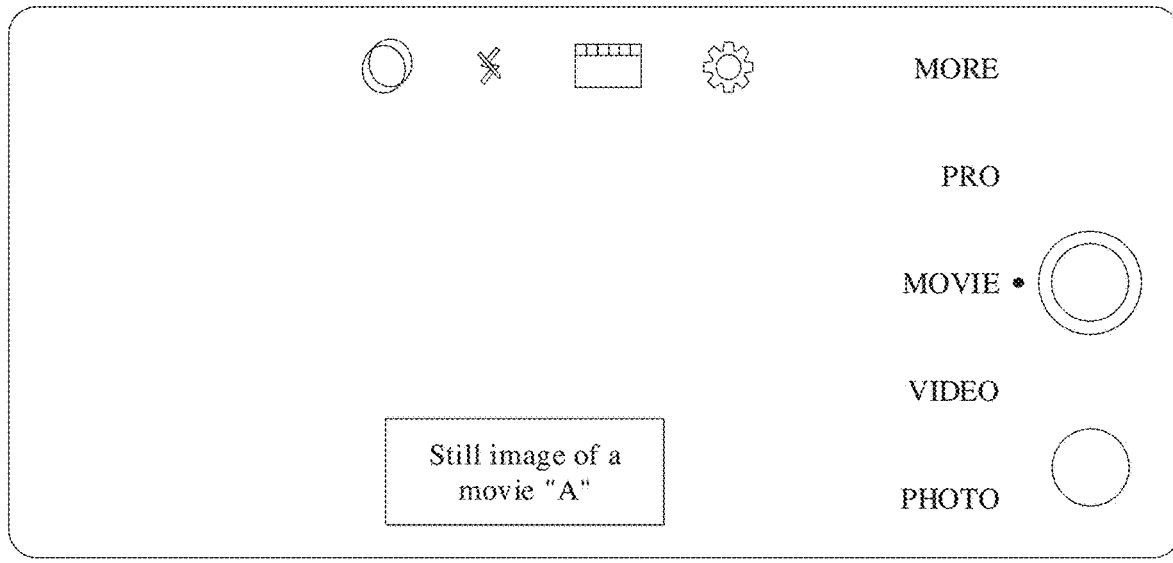
FIG. 3 is a schematic diagram of a user interface in a movie mode according to an embodiment of this application.

The LUT is essentially a mathematical transformation model. One set of RGB values may be output as another set of RGB values by using the LUT, to change an exposure and a color of an image. LUTs corresponding to different video styles may be generated in advance. Before recording a video, the electronic device first determines a video style template. For example, the electronic device may determine the video style template based on a selection of a user or automatically determine the video style template based on a scene corresponding to an image obtained by a current camera through artificial intelligence (Artificial Intelligence, AI). For example, it is assumed that the electronic device is a mobile phone, in a possible implementation, as shown in FIG. 3, a user operates the mobile phone to display a shooting interface. The shooting interface includes a movie mode option. When the user further selects the movie mode option to display a movie mode, a corresponding movie mode interface includes a plurality of video style template options, including, for example, a style template of a movie "A", a style template of a movie "B", and a style template of a movie "C". Only the style template of a movie "A" is shown in the user interface shown in FIG. 3. It may be understood that a plurality of different movie style templates may be displayed side by side in the user interface. LUTs corresponding to different movie style templates may be generated in advance based on corresponding movie color matching styles, and color conversion of the LUTs has a style characteristic of a corresponding movie. For example, a color matching style of the movie "A" is a complementary color. The complementary color means that two corresponding colors form a contrast effect. Contrast is emphasized by two colors of a warm color system and a cold color system, to improve a bright and prominent effect. Usually, two contrasting colors symbolize a conflicting behavior. Through presentation of external complementary colors, that a role is in a conflict state or an exhausted state is expressed. A LUT corresponding to the style template of the movie "A" is used for presenting the complementary colors more distinctly after color mapping is transformed, to simulate the color matching style of the movie "A". In a possible implementation, as shown in FIG. 3, the user operates the mobile phone to display the movie mode, and the mobile phone obtains an image currently shot through a camera lens, determines a scene corresponding to the image according to an AI algorithm, and determines a recommended video style template corresponding to the scene. For example, if it is recognized that a subject of a currently shot image is a young female character, the corresponding recommended video style template is determined to be the style template of the movie "C" according to the algorithm. The movie "C" is a movie themed on the young female character, and a color matching style of the movie "C" may be simulated for a corresponding LUT. For example, if it is recognized that a currently shot image is a city street, the corresponding video style template is determined to be the style template of the movie "B" according to the algorithm. The movie "B" is a movie with a city street as a main scene, and a color matching style of the movie "B" may be stimulated for a corresponding LUT. In this way, a video style template conforming to a current scene may be automatically recommended to the user. A LUT appropriate for a mobile electronic device may be generated by pre-extraction from the movie style.

Step 102: Obtain a video shot through a camera, where the video is corresponding to a preset resolution. For example, after determining the video style template in step 101, if the user taps a shooting option, the mobile phone starts to obtain the video shot through the camera. An initial resolution of the video shot through the camera is the preset resolution. The following uses an example in which the preset resolution is 4K as an example for description.

Figure 4:
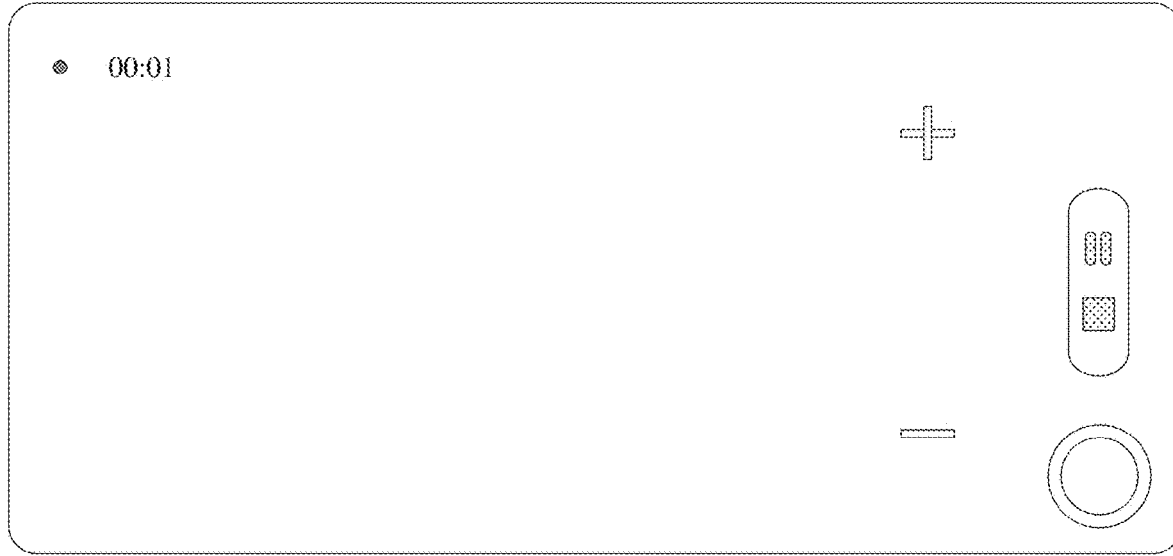
FIG. 4 is a schematic diagram of a video recording interface of a mobile phone according to an embodiment of this application.

Step 103: Snap a corresponding image in the video as a snapped image in response to a snapping instruction. A resolution of the snapped image is, for example, a preset resolution of 4K. For example, as shown in FIG. 4, a key for snapping an image is disposed in a video recording interface. During video recording, when a user taps the key for snapping an image, a snapping instruction is generated, to perform step 103.

Step 104: Process the video by using a logarithm (Logarithm, LOG) curve corresponding to a current photosensitivity ISO of the camera, to obtain a LOG video.

Figure 5:
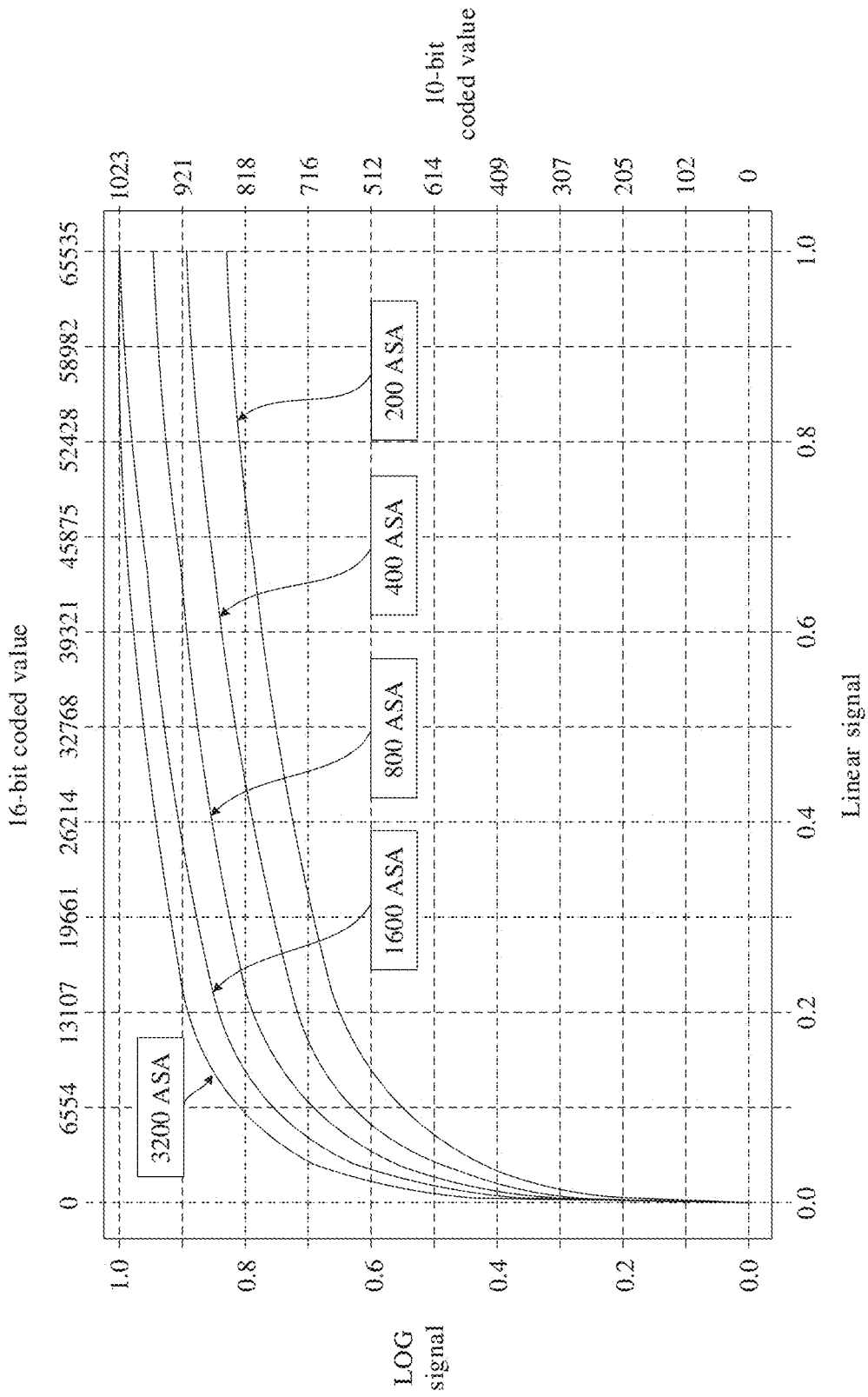
FIG. 5 is a schematic diagram of a LOG curve according to an embodiment of this application.

The LOG curve is a scene-based curve, and the LOG curve is slightly different in different ISOs. As the ISO increases, a maximum value of the LOG curve is also increased. When the ISO is increased to a level, a highlight is presented in a shoulder shape, keeping the highlight from overexposure. FIG. 5 illustrates a LOG curve in which an abscissa is a linear signal, expressed by a 16-bit coded value (Code Value), and an ordinate is a LOG signal processed by using the LOG curve, expressed by a 10-bit coded value. Through processing by using the LOG curve, a signal input of a camera may be used for encoding information of a dark interval to a middle tone (as shown in a steep part of the curve in FIG. 5), to form 10-bit signal output. This conforms to a LOG sensing rule for light by human eyes and keeps information of a dark part maximally. For a LOG video, a limited bit depth may be used for keeping details of a shadow and a highlight maximally. An ASA in FIG. 5 is photosensitivity, and different ASAs correspond to different ISOs, both of which belong to different standards.

Step 105: Process a snapped image by using a LOG curve corresponding to a current ISO of the camera, to obtain a LOG-based snapped image, and process the snapped image obtained in step 103 based on the LOG curve similarly.

Step 106: Convert the LOG video from a preset resolution to a determined video storage resolution if the determined video storage resolution is less than the preset resolution, and process the LOG video based on a LUT corresponding to the determined video style template, to obtain a video corresponding to the determined video style template.

Specifically, for example, if the video storage resolution determined in step 100 is full high definition (Full High Definition. FHD), and the FHD resolution is less than a 4K resolution, that is, the determined video storage resolution is less than the preset resolution, the LOG video is converted from the 4K resolution to the FHD resolution after the LOG video is obtained. Then the LOG video with the FHD resolution is used as an input, to be used in the LUT corresponding to the video style template determined in step 101. Mapping conversion is performed on a LOG video image. After mapping and conversion, the video corresponding to the determined video style template may be obtained. A video output by processing the LOG video based on a LUT may be a video with a Rec.709 color standard or a video with a high-dynamic Range (High-Dynamic Range, HDR) 10 standard. In other words, the video may be converted into a video with the HDR10 standard by processing the LOG video by using the LUT.

Different LUTs are used for the electronic device, and related modules in the electronic device may be matched, to be adapted to LUTs of different styles. For example, if the determined video style template in step 101 is a gray-tone video style template, a gray-tone image is characterized with a strong texture feeling, a low saturation, no more color interference except a color of a person's skin, and a cold color of a dark part. Based on these characteristics, the electronic device may adjust related module parameters while recording a video, keep a texture in an image without strong denoising and sharpening, appropriately reduce the saturation of the image, keep real restoration of a skin color in the image, and adjust the dark part of the image to a cold color.

Step 107: Process the LOG-based snapped image based on the LUT corresponding to the determined video style template, to obtain a snapped image corresponding to the determined video style template. A resolution of the snapped image is equal to the preset resolution.

Specifically, during video recording, in addition to a process of processing the video based on the LOG curve and the LUT to obtain the video corresponding to the determined video style template, the snapped image is processed by using a same LOG curve and LUT. For the snapped image, details are kept during LOG processing in step 105. During LUT processing in step 107, tone tendency is generated, and the snapped image corresponding to the determined video style template is obtained, that is, a snapped image with a color grading effect similar to a color grading effect of a video is obtained. A resolution of the snapped image is always the preset resolution, that is, the 4K resolution.

In the video processing method in this embodiment of this application, during video recording, the LOG video is processed by using a LUT technology in a movie industry and based on the LUT corresponding to the determined video style template. This enables a recorded video to have a style effect corresponding to the determined video style template, to meet a high color grading requirement, and enables the recorded video to have movie quality. In addition, the snapped image is processed based on the LOG curve and the LUT, to obtain a snapped image with details kept and with a tone similar to a tone corresponding to the video style template. The snapped image is always processed at the preset resolution. In this way, even if the video storage resolution is low, a snapped image with a high resolution may be obtained by snapping, to ensure that the snapped image has high definition.

Figure 6:
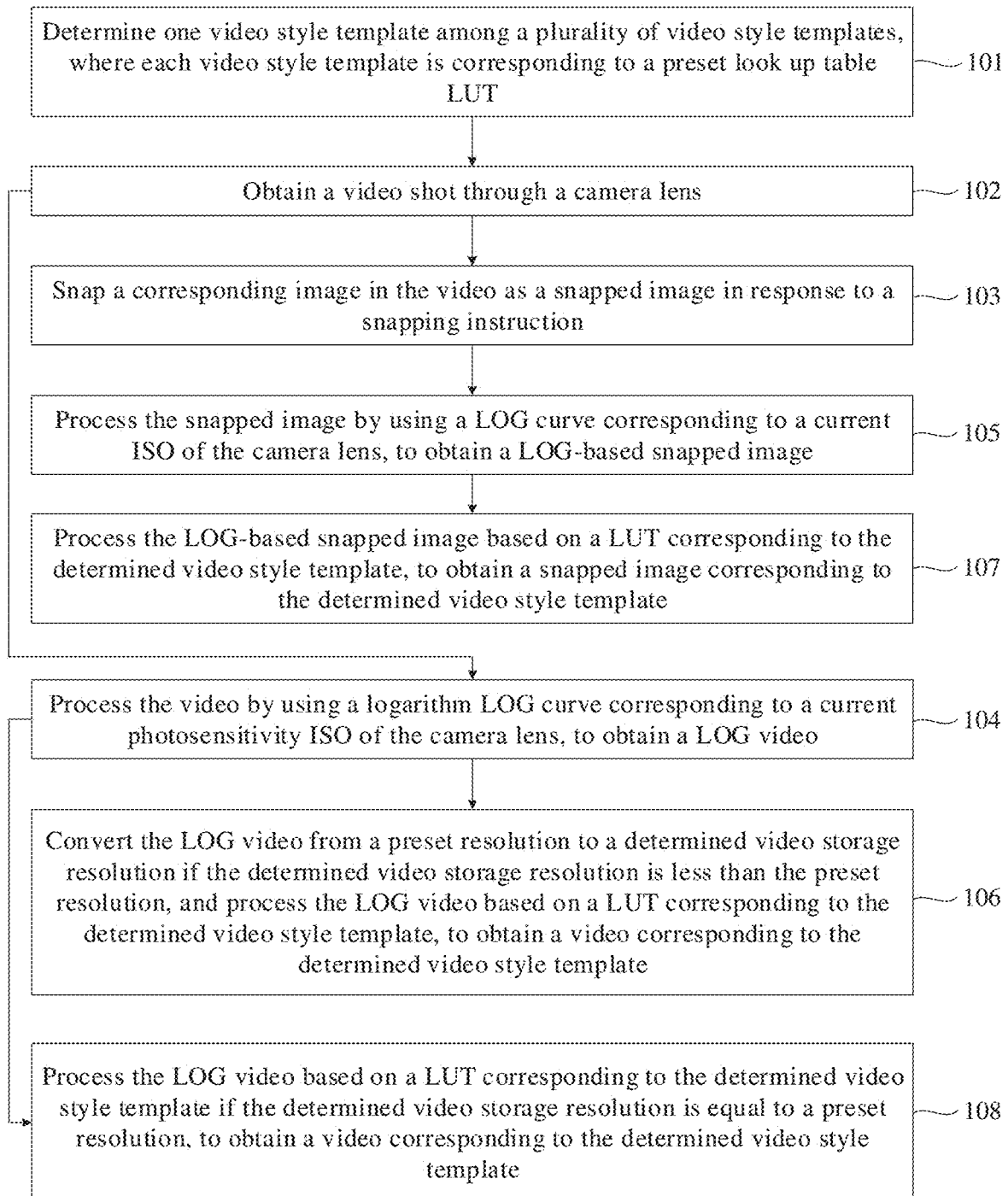
FIG. 6 is a flowchart of another video processing method according to an embodiment of this application.

In a possible implementation, as shown in FIG. 6, the video processing method further includes: Step 108: Process the LOG video based on the LUT corresponding to the determined video style template if the determined video storage resolution is equal to the preset resolution, to obtain the video corresponding to the determined video style template. For example, in step 100, the determined video storage resolution is 4K, that is, the determined video storage resolution is equal to the preset resolution. After the LOG video is obtained, the LOG video with the 4K resolution is directly used as an input to be used in the LUT corresponding to the video style template determined in step 101, and mapping and conversion processing is performed on a LOG video image. After processing, the video corresponding to the determined video style template may be obtained.

Figure 7:
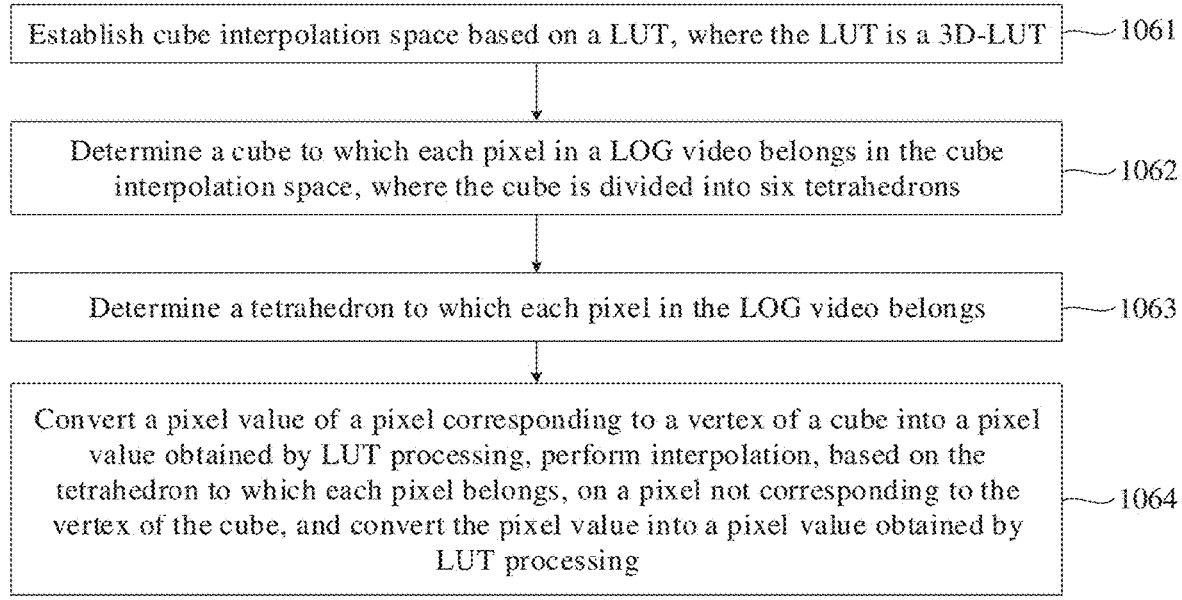
FIG. 7 is a schematic diagram of a specific schematic flowchart of some steps according to an embodiment of this application.

In a possible implementation, as shown in FIG. 7, a process of step 106: processing the LOG video based on a LUT corresponding to the determined video style template, to obtain a video corresponding to the determined video style template includes:

Step 1061: Establish cube interpolation space based on a LUT, where the LUT is a 3D-LUT.

Implementation of the 3D-LUT is performed in the RGB domain, and the 3D-LUT is a color grading and mapping relationship commonly used in a movie industry. An arbitrarily input RGB pixel value may be converted into a corresponding another RGB pixel value. For example, if a 12-bit RGB video image is input, a 12-bit RGB video image is output after LUT processing and mapping. In step 1061, entire RGB color space is evenly divided into, for example, 33×33×33 cubes, corresponding to LUTs. A side length step_size of each cube is, for example, $2^{(12-5)}=2^7$.

Step 1062: Determine a cube to which each pixel in the LOG video belongs in the cube interpolation space, where the cube is divided into six tetrahedrons.

The LOG video is used as an input during LUT processing. A pixel is obtained by processing and mapping each pixel in an image of the LOG video by using the LUT, that is, a process of processing the LOG video by using the LUT may be implemented. In step 1042, a cube to which each pixel in each LOG video as an input belongs in the foregoing cube interpolation space is to be determined, and the cube is divided into six tetrahedrons.

Step 1063: Determine a tetrahedron to which each pixel in the LOG video belongs.

Step 1064: Convert a pixel value of a pixel corresponding to a vertex of a cube into a pixel value obtained by LUT processing, perform interpolation, based on the tetrahedron to which each pixel belongs, on a pixel not corresponding to the vertex of the cube, and convert the pixel value into a pixel value obtained by LUT processing.

Specifically, if an input pixel is located at a vertex of a cube, a mapped RGB pixel value may be directly obtained based on an index of the vertex and a 3D-LUT, that is, a pixel value of the pixel may be mapped and converted into a corresponding pixel value directly by using the LUT. If the pixel is located between vertices of the cube, interpolation is performed based on the tetrahedron to which the pixel belongs. In addition, in step 107, LUT processing may be performed on the LOG-based snapped image in a same method, and a detailed process is not described herein again.

Figure 8:
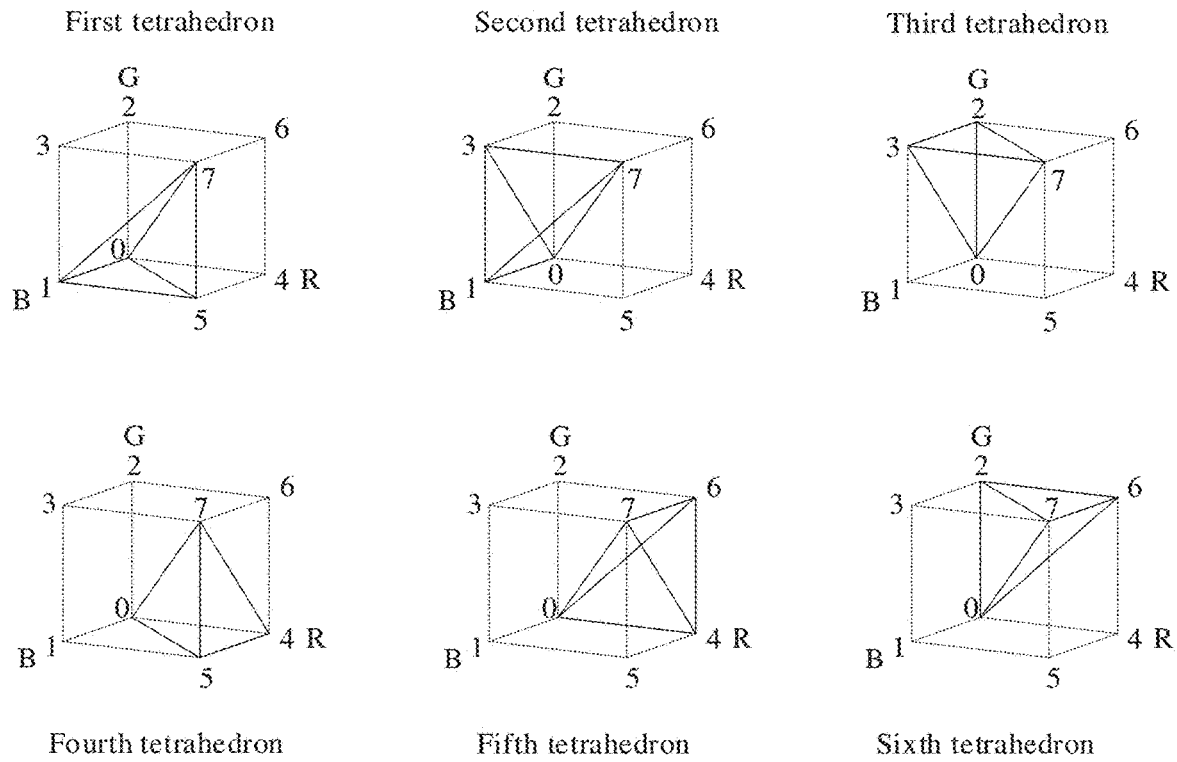
FIG. 8 is a schematic diagram of relations between cubes and tetrahedrons in cube interpolation space according to an embodiment of this application.

In a possible implementation, as shown in FIG. 8, a cube has a $0^{th}$ vertex to a $7^{th}$ vertex, which are respectively expressed by numbers 0 to 7 in FIG. 8. A direction from the $0^{th}$ vertex to a $1^{st}$ vertex is a coordinate axis direction of a blue B channel. A direction from the $0^{th}$ vertex to a $4^{th}$ vertex is a coordinate axis direction of a red R channel. A direction from the $0^{th}$ vertex to a $2^{nd}$ vertex is a coordinate axis direction of a green G channel. The $0^{th}$ vertex, the $1^{st}$ vertex, the $2^{nd}$ vertex, and a $3^{rd}$ vertex are located in a same plane. The $1^{st}$ vertex, the $3^{rd}$ vertex, a $5^{th}$ vertex, and the $7^{th}$ vertex are located in a same plane. The $4^{th}$ vertex, the $5^{th}$ vertex, a $6^{th}$ vertex, and the $7^{th}$ vertex are located in a same plane. The 0th vertex, the $2^{nd}$ vertex, the $4^{th}$ vertex, and the $6^{th}$ vertex are located in a same plane. The $0^{th}$ vertex, the $1^{st}$ vertex, the $5^{th}$ vertex, and the $7^{th}$ vertex form a first tetrahedron. The $0^{th}$ vertex, the $1^{st}$ vertex, the $3^{rd}$ vertex, and the $7^{th}$ vertex form a second tetrahedron. The $0^{th}$ vertex, the $2^{nd}$ vertex, the $3^{rd}$ vertex, and the $7^{th}$ vertex form a third tetrahedron. The $0^{th}$ vertex, the $4^{th}$ vertex, the $5^{th}$ vertex, and the $7^{th}$ vertex form a fourth tetrahedron. The $0^{th}$ vertex, the $4^{th}$ vertex, the $6^{th}$ vertex, and the $7^{th}$ vertex form a fifth tetrahedron. The $0^{th}$ vertex, the $2^{nd}$ vertex, the $6^{th}$ vertex, and the $7^{th}$ vertex form a sixth tetrahedron. Coordinates of an $i^{th}$ vertex are (Ri, Gi, Bi), and a value of i is 0, 1, 2, 3, . . . , or 7. A pixel value of the $i^{th}$ vertex obtained by LUT processing is VE (Ri, Gi, Bi), where E is R, G, and B respectively.

In step 1064, a process of performing interpolation, based on the tetrahedron to which each pixel belongs, on a pixel not corresponding to the vertex of the cube, and convert the pixel value into a pixel value obtained by LUT processing includes the following.

A pixel value VE (R, G, B) of a E channel obtained by LUT processing is generated based on a current pixel (R, G, B), where E is R, G, and B respectively, and the current pixel means a pixel to be interpolated currently in an input LOG video.

VE (R, G, B)=VE (R0, G0, B0)+(delta_valueR_E×deltaR+delta_valueG_E×deltaG+delta_valueB_E×deltaB+(step_siz>>1))/(step_size).

VE (R0, G0, B0) is a pixel value of a E channel obtained by LUT processing at the $0^{th}$ vertex (R0, G0, B0), where E is R, G, and B respectively.

delta_valueR_E is a difference between pixel values of the E channel that are obtained by LUT processing and that are of two vertices in the coordinate axis direction of the R channel corresponding to the tetrahedron to which the current pixel belongs. delta_valueG_E is a difference between pixel values of the E channel that are obtained by LUT processing and that are of two vertices in the coordinate axis direction of the G channel corresponding to the tetrahedron to which the current pixel belongs. deta_valueB_E is a difference between pixel values of the E channel that are obtained by LUT processing and that are of two vertices in the coordinate axis direction of the B channel corresponding to the tetrahedron to which the current pixel belongs.

deltaR is a difference between an R value in the current pixel (R, G, B) and an R0 value at the $0^{th}$ vertex (R0, G0, B0), deltaG is a difference between a G value in the current pixel (R, G, B) and a G0 value at the $0^{th}$ vertex (R0, G0, B0), and deltaB is a difference between a B value in the current pixel (R, G, B) and a B0 value at the $0^{th}$ vertex (R0, G0, B0).

step_size is a side length of the cube.

>> represents a right shift operation, and (step_size>>1) represents a right shift of step_size by one bit.

Specifically, for example, for the input current pixel (R, G, B), deltaR, deltaG, and deltaB are calculated. deltaR, deltaG, and deltaB represent distances between the current pixel (R, G, B) and the $0^{th}$ vertex respectively, and deltaR=R−R0, deltaG=G−G0, and deltaB=B−B0. In step 1043, a tetrahedron to which the current pixel belongs may be determined based on a relationship between deltaR, deltaG, and deltaB. If deltaB≥deltaR and deltaR≥deltaG, it is determined that the current pixel belongs to the first tetrahedron. If deltaB−deltaG and deltaG≥deltaR, it is determined that the current pixel belongs to the second tetrahedron. If deltaG≥deltaB and deltaB≥deltaR, it is determined that the current pixel belongs to the third tetrahedron. If deltaR≥deltaB and deltaB≥deltaG, it is determined that the current pixel belongs to the fourth tetrahedron. If deltaR deltaG and deltaG≥deltaB, it is determined that the current pixel belongs to the fifth tetrahedron. If the relationship between deltaR, deltaG, and deltaB does not meet any condition for the first tetrahedron to the fifth tetrahedron, it is determined that the current pixel belongs to the sixth tetrahedron. It is assumed that the current pixel (R, G, B) belongs to the first tetrahedron, during calculation of a pixel value VR (R, G, B) of the R channel of the pixel after LUT processing, delta_valueR_E is a difference between pixel values of the E channel that are obtained by LUT processing and that are of two vertices in the coordinate axis direction of the R channel corresponding to the tetrahedron to which the current pixel belongs, that is, delta_valueR_R=VR (R5, G5, B5)−VR (R1, G1, B1), delta_valueG_R=VR (R7, G7, B7)−VR (R5, G5, B5), delta_valueB_R=VR (R1, G1, B1)−VR (R0, G0, B0), VR (R, G, B)=VR (R0, G0, B0)+(delta_valueR_R×deltaR+delta_valueG_R×deltaG+delta_valueB_R×deltaB+(step_size>>1))/(step_size). During calculation of a pixel value VG (R, G, B) of the G channel of the pixel after LUT processing, delta_valueG_E is a difference between pixel values of the E channel that are obtained by LUT processing and that are of two vertices in the coordinate axis direction of the G channel corresponding to the tetrahedron to which the current pixel belongs, that is, delta_valueR_G=VR (R5, G5, B5)−VR (R1. G1, B1), delta_valueG_G=VG (R7, G7, B7)−VG (R5, G5, B5), delta_valueB_G=VG (R1, G1, B1)−VG (R0, G0, B0), VG (R, G, B)=VG (R0, G0, B0)+(delta_valueR_G×deltaR+delta_valueG_G×deltaG+delta_valueB_G×deltaB+(step_size>>1))/(step_size). During calculation of a pixel value VG (R, G, B) of the B channel of the pixel after LUT processing, delta_valueB_E is a difference between pixel values of the E channel that are obtained by LUT processing and that are of two vertices in the coordinate axis direction of the B channel corresponding to the tetrahedron to which the current pixel belongs, that is, delta_valueR_B=VB (R5, G5, B5)−VB (R1, G1, B1), delta_valueG_B=VB (R7, G7, B7)−VB (R5, G5, B5), delta_valueB_B=VB (R1, G1, B1)−VB (R0, G0, B0), VB (R, G, B)=VB (R0, G0, B0)+(delta_valueR_B×deltaR+delta_valueG_B×deltaG+delta_valueB_B×deltaB+(step_size>>1))/(step_size). If the current pixel (R, G, B) belongs to another tetrahedron, the calculation process is similar, and a difference lies in calculation of delta_valueR_E. For example, for the second tetrahedron, delta_valueR_R=VR (R7, G7, B7)−VR (R3, G3, B3), delta_valueG_R=VR (R3, G3, B3)−VR (R1, G1, B1), delta_valueB_R=VR (R1, G1, B1)−VR (R0, G0, B0). The calculation process based on the another tetrahedron is not described herein in detail.

In a possible implementation, before a process of step 104: processing the LOG video based on a LUT corresponding to the determined video style template, to obtain a video corresponding to the determined video style template, the method further includes: converting the LOG video from a LOG video in RGB color space to a LOG video in YUV color space; and performing YUV denoising on the LOG video in the YUV color space, to obtain a denoised LOG video. The LOG video using the LUT in step 104 is the LOG video obtained by YUV denoising. Because the LOG video obtained in step 104 can reflect details in a dark part, but amplify noise in the dark part simultaneously, that is, noise is introduced, the LOG video may be converted into a LOG video in the YUV color space and then subject to YUV denoising, and the noise is reduced by an algorithm, to improve quality of a video image. Similarly, for a snapped image, a LOG-based snapped image is converted from a LOG video in RGB color space to a LOG-based snapped image in YUV color space, and YUV denoising is performed on the LOG-based snapped image in the YUV color space, so that a denoized LOG-based snapped image is obtained. Then step 107 is performed for LUT processing.

In a possible implementation, before a process of step 105: processing the LOG video based on a LUT corresponding to the determined video style template, to obtain a video corresponding to the determined video style template, the method further includes: converting the denoised LOG video from the LOG video in the YUV color space to the LOG video in the RGB color space. After a process of step 106: processing the LOG video based on a LUT corresponding to the determined video style template, to obtain a video corresponding to the determined video style template, the method further includes: converting a video that is in the RGB color space and that is corresponding to the determined video style template into a video in the YUV color space. Because a process of processing the LOG video based on the LUT in step 106 is implemented based on the RGB color space, before step 104, the video in the YUV color space is first converted into the video in the RGB color space, and then after step 106, the video in the RGB color space is reconverted into the video in the YUV color space.

Figure 9:
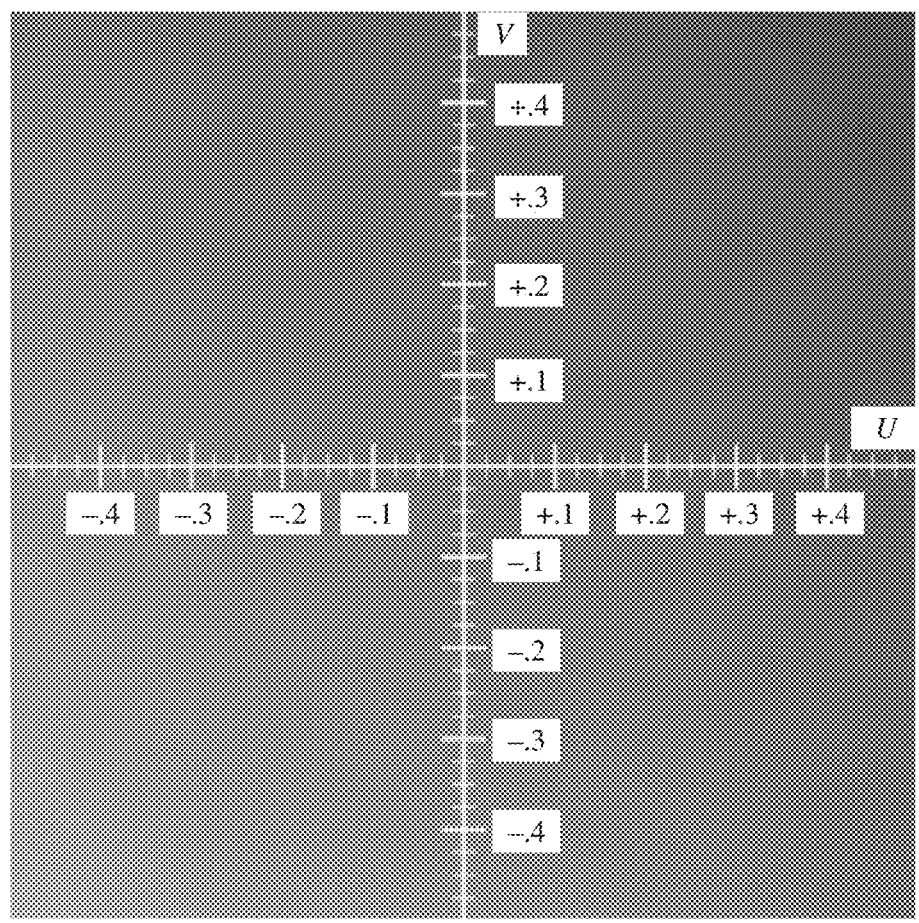
FIG. 9 is a schematic diagram of a UV plane.

YUV (also referred to as YCbCr) is a color coding method used in a European television system. In a modern color television system, a three-tube color camera or a color CCD camera is usually used for image shooting, and then an obtained color image signal is subject to color separation, amplification, and correction, so that an RGB signal is obtained. The RGB signal is then changed into a luminance signal Y and two color difference signals B-Y (U) and R-Y (V) by using a matrix conversion circuit. Finally, a transmit end encodes the three signals respectively and then transmits encoded signals through a same channel. This color representation method is the YUV color space. YCbCr is a specific implementation of a YUV model and is actually a scaled and shifted copy of YUV. Y has a same meaning as Y in YUV, and Cb and Cr both mean colors, except that Cb and Cr differ in a representation method. In a YUV family, YCbCr is a most widely used member in a computer system, and is used in a wide application field, such as JPEG and MPEG. Generally, YUV mostly means YCbCr. A UV plane is shown in FIG. 9.

Interconversion of the RGB color space and the YUV color space may be implemented by a matrix of 3×3:

$$\begin{pmatrix} Y \\ U \\ V \end{pmatrix} = M_{rgb2yuv} \begin{pmatrix} R \\ G \\ B \end{pmatrix}, \begin{pmatrix} R \\ G \\ B \end{pmatrix} = M_{yuv2rgb} \begin{pmatrix} Y \\ U \\ V \end{pmatrix}$$

YUV has four main sampling formats: YCbCr 4:2:0, YCbCr 4:2:2, YCbCr 4:1:1, and YCbCr 4:4:4.

Figure 10:
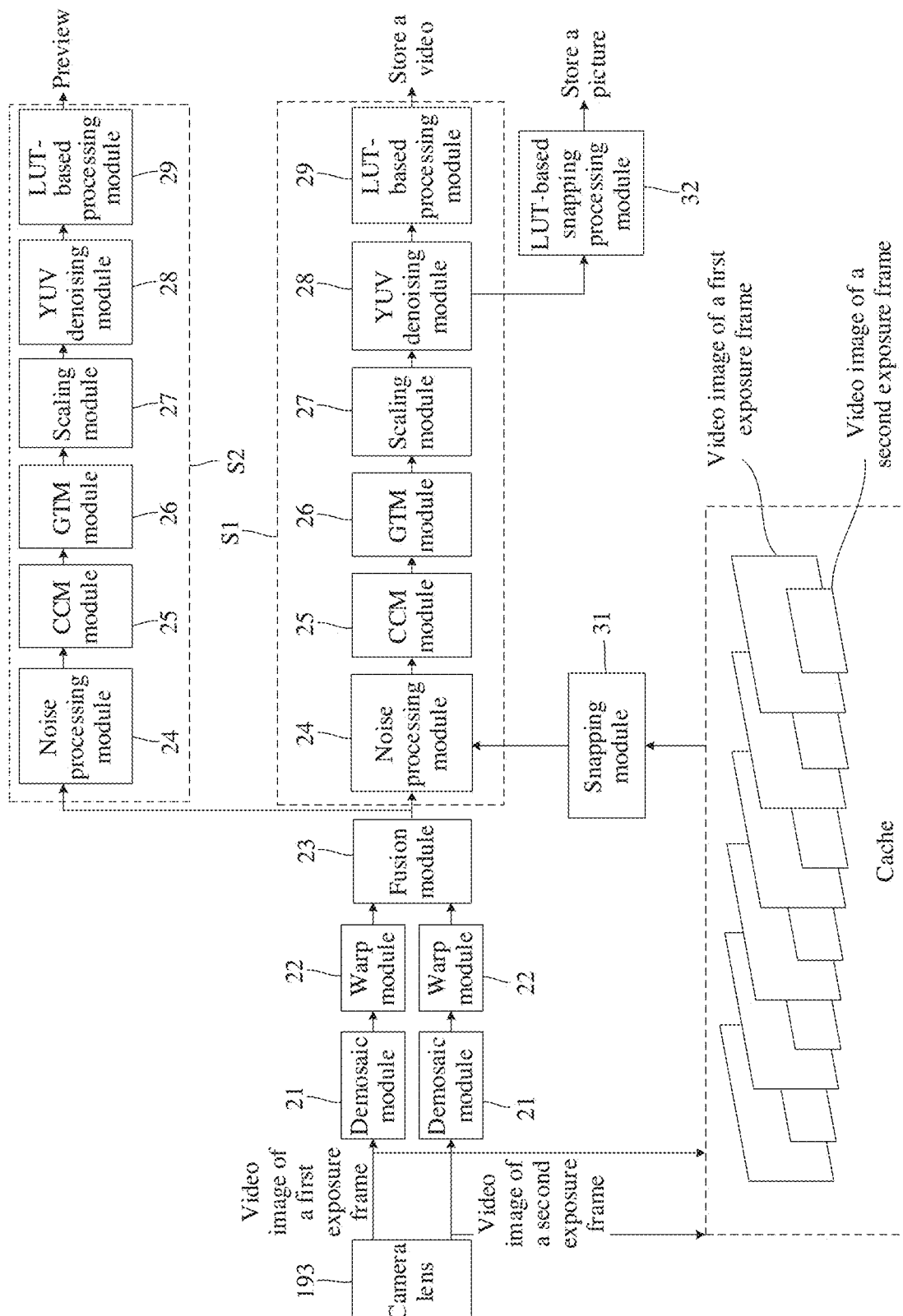
FIG. 10 is a block diagram of another structure of an electronic device according to an embodiment of this application.

In a possible implementation, as shown in FIG. 10, an electronic device may specifically include a camera 193, demosaic (Demosaic) modules 21, warp modules 22, a fusion module 23, noise processing modules 24, color correction matrix (Color Correction Matrix, CCM) modules 25, global tone mapping (Global Tone Mapping, GTM) modules 26, scaling (Scaler) modules 27, YUV denoising modules 28, LUT-based processing modules 29, a snapping module 31, and a LUT-based snapping processing module 32. For example, during video recording, the camera 193 obtains a video image of a first exposure frame and a video image of a second exposure frame by shooting. An exposure time corresponding to the video image of a first exposure frame is greater than an exposure time corresponding to the video image of a second exposure frame. The video image of a first exposure frame and the video image of a second exposure frame are processed by the demosaic modules 21 respectively. This enables the images to be converted from a RAW domain to an RGB domain. Then the two video images are processed by the warp (warp) modules 22 respectively, so that alignment and stabilization effects are achieved by warping the video images. Then the two video images are processed by the fusion module 23, so that the two video images are fused as one video image, and fused data is divided into two data streams. A video processing method includes a first video processing procedure S1 and a second video processing procedure S2. One of the two data streams processed by the fusion module 23 enters the first video processing procedure S1, and the other of the two data streams enters the second video processing procedure S2.

In the first video processing procedure S1, a process of converting the video shot through the camera into a video in wide-gamut color space, a process of step 104: processing the video by using a logarithm curve LOG corresponding to a current photosensitivity ISO of the camera, to obtain a LOG video, and a process of step 106 or step 108: processing the LOG video based on a LUT corresponding to the determined video style template, to obtain a video corresponding to the determined video style template are performed.

For example, the first video processing procedure S1 includes: The noise processing module 24 denoises a video that is from the fusion module 23 and that is shot through the camera 193, the CCM module 25 processes a denoised video to be converted into a video in wide-gamut RGB color space, the GTM module 26 performs step 104 to process a converted video by using a LOG curve corresponding to a current photosensitivity ISO of the camera, to obtain a LOG video, the scaling module 27 scales the video, the YUV denoising module 28 performs YUV denoising on the video, and then the LUT-based processing module 29 performs step 106 or step 108 to process, based on the LUT, a LOG video obtained by YUV denoising, to obtain the video corresponding to the determined video style module. After the first video processing procedure S1, the video corresponding to the determined video style template in the first video processing procedure S1 is stored as the video. In other words, a video with a style may be obtained. It should be noted that if the determined video storage resolution is less than a preset resolution, in the scaling module 27, a video resolution is converted from the preset resolution to the determined video storage resolution. For example, if the preset resolution is 4K, and the determined video storage resolution is FHD, a video stream resolution before the scaling module 27 is 4K, and a video stream resolution after the scaling module 27 is FHD.

The second video processing procedure S2 includes: The noise processing module 24 denoises a video that is from the fusion module 23 and that is shot through the camera 193, the CCM module 25 processes a denoised video to be converted into a video in wide-gamut RGB color space, the GTM module 26 performs step 104 to process a converted video by using a LOG curve to obtain a LOG video, the scaling module 27 scales the video, the YUV denoising module 28 performs YUV denoising on the video, and then the LUT-based processing module 29 performs step 107 to process, by using the LUT, a video obtained by YUV denoising, to obtain the video corresponding to the determined video style module. The video corresponding to the determined video style template in the second video processing procedure S2 is previewed.

That is, during video recording, two video streams are respectively processed in the first video processing procedure S1 and the second video processing procedure S2. Two same algorithms are respectively used in the two video streams. The two procedures each include processing based on the LOG curve in step 103 and processing based on the LUT in step 104. The video corresponding to the determined video style template in the first video processing procedure is stored; and the video corresponding to the determined video style template in the second video processing procedure is previewed.

In addition, while the camera 193 is snapping a video, an image is stored in a cache. In response to a snapping instruction, the snapping module 31 snaps a corresponding image from the cache as a snapped image. The snapped image is retransmitted to the noise processing module 24 for noise processing. A snapped image obtained by noise processing is converted into an image in wide-gamut RGB color space by the CCM module 25. Then the GTM module 26 performs step 105: processing the snapped image by using a LOG curve corresponding to a current ISO of the camera, to obtain a LOG-based snapped image. The scaling module 27 scales the LOG-based snapped image, and the YUV denoising module performs YUV denoising on a scaled video. The LUT-based snapping processing module 32 performs step 107: processing the LOG-based snapped image based on a LUT corresponding to the determined video style template, to obtain a snapped image corresponding to the determined video style template. The snapped image is stored as a picture. It is assumed that a preset resolution of a snapped image is 4K, even if the determined video storage resolution is FHD, a resolution of the snapped image is always 4K.

The following describes relevant content of the RAW and YUV.

Bayer domain: Each lens on a digital camera is provided with an optical sensor to measure luminance of light. However, to obtain a full-color image, three optical sensors are usually used to obtain information on three primary colors, red, green, and blue, respectively. To reduce costs and a volume of the digital camera, a manufacturer usually uses a CCD image sensor or CMOS image sensor. Usually, a raw image output by the CMOS image sensor is in RGB format of the Bayer domain, and a single pixel includes only one color value. To obtain a gray value of an image, color information of each pixel is to be inserted and supplemented, and then a gray value of each pixel is to be calculated. In other words, the Bayer domain means a raw image format in the digital camera.

The RAW domain, alternatively referred to as a RAW format, means an unprocessed image. Further, the RAW image may be understood as raw data of a digital signal into which a photosensitive element of a camera, such as a complementary metal oxide semiconductor (Complementary Metal Oxide Semiconductor, CMOS) or a charge-coupled device (Charge-coupled Device, CCD), converts a captured light source signal. A RAW file is a file in which raw information of a sensor of the digital camera is recorded, and setting of some metadata (Metadata, such as photosensitivity ISO (International Organization for Standardization), a shutter speed, an aperture value, and a white balance) generated due to shooting by the camera is recorded. The RAW domain is a format without non-linear processing and compression by the ISP. A full name of the RAW format is a RAW image format.

YUV is a color encoding method and is usually used in various video processing components. When encoding a picture or a video, in consideration of human perceptibility, YUV allows a bandwidth of chrominance to be reduced. YUV is a kind of compiled true-color space (color space), and proprietary terms such as Y'UV, YUV, YCbCr, and YPbPr may all be referred to as YUV, and overlap each other. "Y" represents luminance (Luminance or Luma), that is, a grayscale value. "U" and "V" represent chrominance (Chrominance or Chroma), and are used for describing a color and saturation of a video and specifying a color of a pixel. Generally, YUV is divided into two formats. One of the two formats is a packed format (packedformats) in which Y, U, V are stored as a macro pixels array in a manner similar to a manner in which RGB is stored. The other of the two formats is a planar format (planarformats) in which three components of Y, U, and V are stored in different matrices respectively. The planar format (planarformats) means that every Y component, U component, and V component are organized in separate planes, that is, all U components are behind the Y component, and the V component is behind all U components.

In a possible implementation, step 102: obtaining a video shot through a camera includes: alternately obtaining a video image of a first exposure frame and a video image of a second exposure frame, where a time for which the video image of a first exposure frame is exposed is greater than a time for which the video image of a second exposure frame is exposed. A process of step 103: snapping a corresponding image in the video as a snapped image in response to a snapping instruction includes: using the video image of a second exposure frame as a reference frame if a moving object is detected in a current video; or using the video image of a first exposure frame as a reference frame if no moving object is detected in a current video; and fusing a plurality of frames of video images into the snapped image based on the reference frame.

Specifically, for example, the camera 193 alternately shoots images based on different exposure time, and a latestly shot image is stored in a cache. When the user performs snapping, the snapping instruction is generated. Based on the snapping instruction, continuous 10 frames of images corresponding to snapping time points are obtained from the cache, including five frames of video images of a first exposure frame and five frames of video images of a second exposure frame. Then the snapping module 31 fuses the 10 frames of images. During fusion, a reference frame is mainly used as a body of a fused image, and another frame of an image is used to assist in providing information required during fusion. Therefore, the reference frame may be determined based on whether a moving object is detected in a video. When the moving object is detected, a video image of a second exposure frame which is exposed for a short time is used as the reference frame. When no moving object is detected, a video image of a first exposure frame which is exposed for a long time is used as the reference frame, to improve an effect of a snapped image. In a moving scene, the time for which the video image of a second exposure frame is exposed is short, and the video image of a second exposure frame is fused as the reference frame, to reduce a smearing phenomenon. In a still scene, the time for which the video image of a first exposure frame is long, and the video image of a first exposure frame is fused as the reference frame, to enable imaging quality of a still image to be better. During video shooting, when a user performs snapping, the user snaps a corresponding image from the cache. That is, a zero shutter lag (Zero Shutter Lag, ZSL) technology is referenced, to reduce a lag during snapping, ensuring that the lag is within 0±50 ms to the greatest extent.

In a possible implementation, a video resolution in the second video processing procedure is less than a resolution of the snapped image. For example, a recorded video stored after the first video processing procedure has the 4K resolution, a picture stored after image snapping has the 4K resolution, and an image previewed after the second video processing procedure has an FHD resolution.

In a possible implementation, before a process of step 107: processing the LOG-based snapped image based on a LUT corresponding to the determined video style template, to obtain a snapped image corresponding to the determined video style template, the method further includes: converting the LOG-based snapped image from 10-bit image data to 8-bit image data. In this way, a bit depth may be adapted to a common picture format. In another possible implementation, if a picture format stored for the snapped image supports 10 bit, conversion may not be required. For example, if a picture format stored for the snapped image is 8-bit joint photographic experts group (Joint Photographic Experts Group, JPEG), the LOG-based snapped image is to be converted from 10-bit image data to 8-bit image data. If a picture format stored for the snapped image is 10-bit high efficiency image file format (High Efficiency Image File Format, HEIF), the LOG-based snapped image is not to be converted from 10-bit image data to 8-bit image data.

Figure 11:
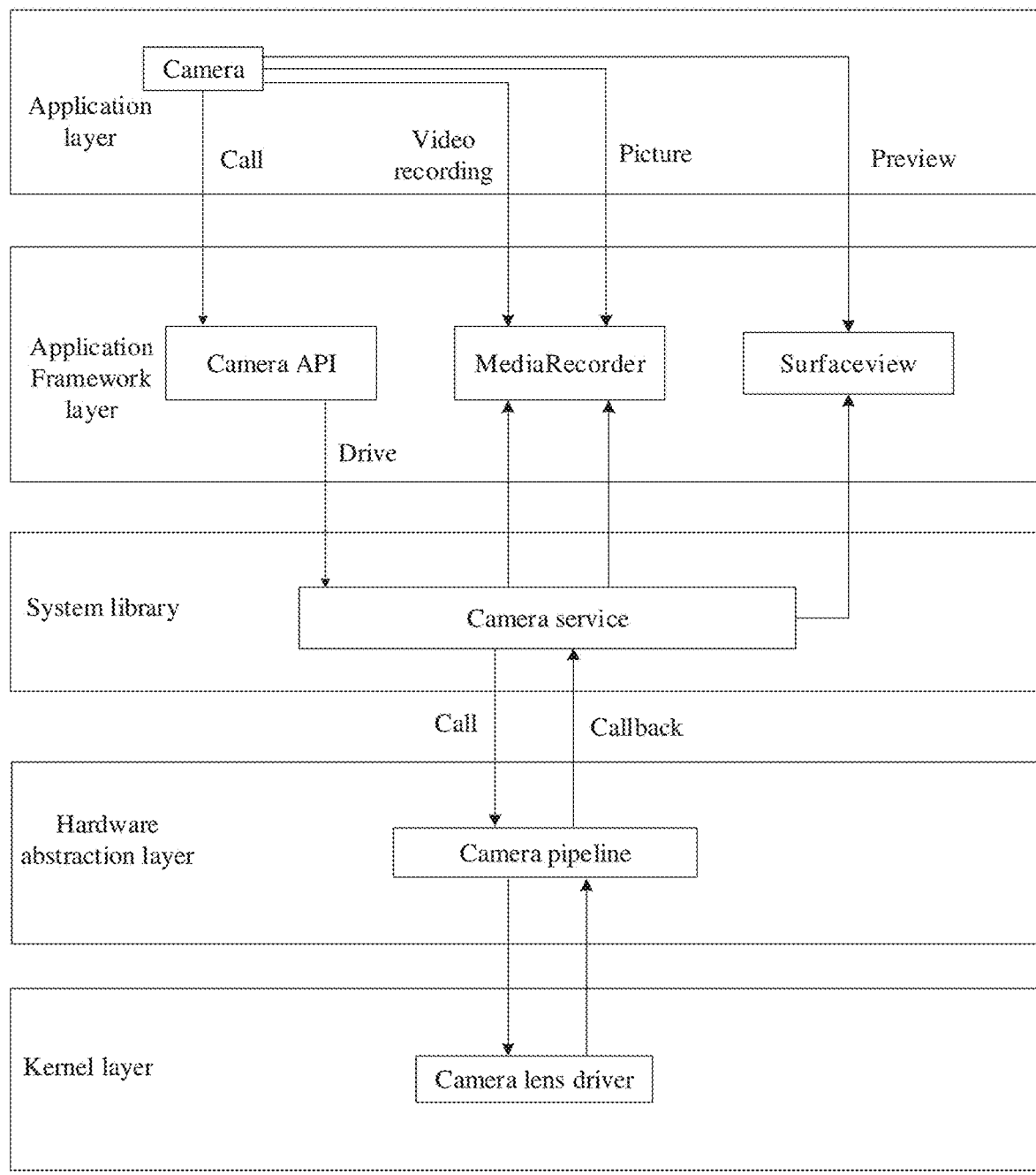
FIG. 11 is a block diagram of a software structure of an electronic device according to an embodiment of this application.

Embodiments of this application are described below with reference to a software architecture. In an embodiment of this application, an Android system of a layered architecture is used as an example to describe a software structure of the electronic device 100. FIG. 11 is a block diagram of the software structure of the electronic device 100 according to an embodiment of this application.

Software is divided into several layers by using the layered architecture, and each layer has a definite role and task. The layers communicate with each other by using a software interface. In some embodiments, an Android system is divided into five layers: an application (Application) layer, an application framework (framework) layer, a system library (library), a hardware abstraction layer (Hardware Abstraction Layer, HAL) layer, and a kernel layer from top to bottom.

The application layer may include applications such as a camera.

The application framework layer may include a camera application programming interface (Application Programming Interface, API), MediaRecorder, Surfaceview, and the like. MediaRecorder is configured to record video or picture data and to enable such data accessible to an application. Surfaceview is configured to display a previewed image.

The system library may include a plurality of functional modules, for example, CameraSevice.

The hardware abstraction layer is configured to provide interface support, including, for example, a camera pipeline CameraPipeline to be called by a camera service.

The kernel layer is a layer between hardware and software. The kernel layer includes a display driver, a camera driver, and the like.

With reference to a specific scene in which a video is captured, the application layer sends a CaptureRequest. The request is corresponding to a stream of a video, a video of a snapped image, and a preview stream. The HAL calls back three streams based on the dataflow (dataflow). The preview stream is sent for display, and the stream of a video and the stream of a snapped image are sent to a mediacodec.

The recorded video processing method provided in embodiments of this application may be represented by a plurality of functions in two shooting modes. The two shooting modes may mean a movie mode and a professional mode.

The movie mode is a shooting mode related to a movie theme. In this mode, an image displayed by an electronic device 100 may present an effect of viewing a movie to the user from senses. The electronic device 100 further provides a plurality of video style templates related to the movie theme. The user may use the video style templates to obtain a tone-adjusted image or video. Tones of the images or videos are similar to or the same as tones of a movie. In the following embodiments of this application, in the movie mode, at least an interface for the user to trigger a LUT function and an HDR10 function may be provided. Refer to the following embodiment for description of the LUT function and the HDR10 function in detail.

For example, it is assumed that the electronic device 100 is a mobile phone. In a possible implementation, as shown in FIG. 3, the electronic device may display a movie mode in response to an operation of a user. For example, the electronic device 100 may detect a touch operation performed by the user on a camera application. In response to the operation, the electronic device 100 displays a default shooting interface of the camera application. The default shooting interface may include: a preview box, a shooting mode list, a gallery shortcut key, a shutter control, and the like.

The preview box may be used to display an image captured by a camera 193 in real time. The electronic device 100 may refresh display content in the preview box in real time, so that the user previews an image currently captured by the camera 193.

One or more shooting mode options may be displayed in the shooting mode list. The one or more shooting mode options may include: a portrait mode option, a video mode option, a photo mode option, a movie mode option, and a professional option. The one or more shooting mode options may be expressed as text information on an interface, such as "PORTRAIT", "VIDEO", "PHOTO", "MOVIE", and "PRO". This application is not limited thereto. The one or more shooting mode options may be alternatively displayed as icons or interactive elements (interactive element, IE) in other forms on the interface.

The gallery shortcut may be used for starting a gallery application. The gallery application is an application for picture management on an electronic device such as a smartphone or a tablet computer, and may also be referred to as an "album". A name of the application is not limited in this embodiment. The gallery application may support the user in performing various operations on a picture stored in the electronic device 100, for example, operations such as browsing, editing, deleting, and selecting.

The shutter control may be configured to monitor an operation performed by the user to trigger shooting. The electronic device 100 may detect a user operation acting on the shutter control. In response to the operation, the electronic device 100 may store an image in the preview box as a picture in the gallery application. In addition, the electronic device 100 may further display a thumbnail of a stored image in the gallery shortcut. That is, the user may tap the shutter control to trigger image shooting. The shutter control may be a button or a control in another form.

The electronic device 100 may detect a touch operation by a user acting on the movie mode option. In response to the operation, the electronic device displays a user interface shown in FIG. 3.

In some embodiments, the electronic device 100 may start the movie mode by default after the camera application is started. This application is not limited thereto. The electronic device 100 may alternatively start the movie mode in another manner. For example, the electronic device 100 may alternatively start the movie mode based on a voice instruction of a user, which is not limited in this embodiment of this application.

The electronic device 100 may detect a touch operation by a user acting on the movie mode option. In response to the operation, the electronic device displays a user interface shown in FIG. 3.

The user interface shown in FIG. 3 includes functional options including an HDR10 option, a flash option, a LUT option, and a setting option. The plurality of functional options may detect a touch operation of the user. In response to the operation, a corresponding shooting function is enabled or disabled, such as an HDR10 function, a flash function, a LUT function, and a setting function.

The electronic device may enable the LUT function. The LUT function may change a display effect of a previewed image. Actually, a look up table is introduced in the LUT function. The look up table is equivalent to a color conversion model capable of outputting an adjusted color value based on an input color value. A color value of an image captured by a camera is equivalent to an input value. After different color values pass through the color conversion model, output values can be obtained correspondingly. Finally, an image displayed in the preview box is an image adjusted by the color conversion model. The electronic device 100 uses the LUT function to display an image including color values adjusted by the color conversion model, to achieve an effect of adjusting an image tone. After the LUT function is enabled, the electronic device 100 may provide a plurality of video style templates. One video style template is corresponding to one color conversion model, and different video style templates may bring different display effects to a previewed image. In addition, the video style templates may be associated with the movie theme. The video style templates may provide the previewed image with an adjusted tone that is similar to or the same as a tone in a movie, creating an atmosphere for the user in which a movie is shot.

In addition, after the electronic device 100 enables the LUT function, the electronic device 100 may determine one video style template among a plurality of video style templates based on a currently previewed video image. The determined video style template may be displayed in an interface, so that the user may understand the currently determined video style template. For example, the plurality of video style templates include a style template of a movie "A", a style template of a movie "B", and a style template of a movie "C". LUTs corresponding to different style templates of movies may be generated in advance based on corresponding color matching styles of movies. Color conversion of the LUT has a style characteristic corresponding to a movie. A LUT appropriate for a mobile electronic device may be generated by pre-extraction from the movie style. Enabling the LUT function changes a tone of the previewed video image. As illustrated in FIG. 3, the electronic device 100 determines and displays the style template of the movie "A".

In some embodiments, the electronic device 100 may select a video style template based on a sliding operation of a user. Specifically, after the electronic device 100 detects a user operation of the user to enable the LUT function and displays a LUT preview window, the electronic device 100 may select a first video style template in the LUT preview window by default as a video style template selected by the electronic device 100. Then the electronic device 100 may detect a left-right sliding operation of the user acting on the LUT preview window and move a position of each video style template in the LUT preview window. When the electronic device 100 no longer detects the sliding operation of the user, the electronic device 100 uses the first video style template displayed in the LUT preview window as the video style template selected by the electronic device 100.

In some embodiments, in addition to changing a display effect of a previewed image by using a video style template, the electronic device 100 may detect a user operation of starting to record a video after the video style template is detected. In response to the operation, the electronic device 100 starts to record a video, to obtain a video with a display effect adjusted by using the video style template. In addition, during video recording, the electronic device 100 may also detect a user operation of shooting a photo. In response to the operation, the electronic device 100 stores, as a picture, a previewed image to which a video style template is added in the preview box, to obtain an image with a display effect adjusted by using the video style template.

The electronic device may enable the HDR10 function. In the HDR10 mode, HDR is a high-dynamic range (High-Dynamic Range, HDR). Compared with a normal image, HDR can provide more dynamic ranges and image details, and can better reflect a visual effect in a real environment. 10 in HDR10 is 10 bits, and HDR10 can record a video in a high dynamic range of 10 bits.

Figure 12:
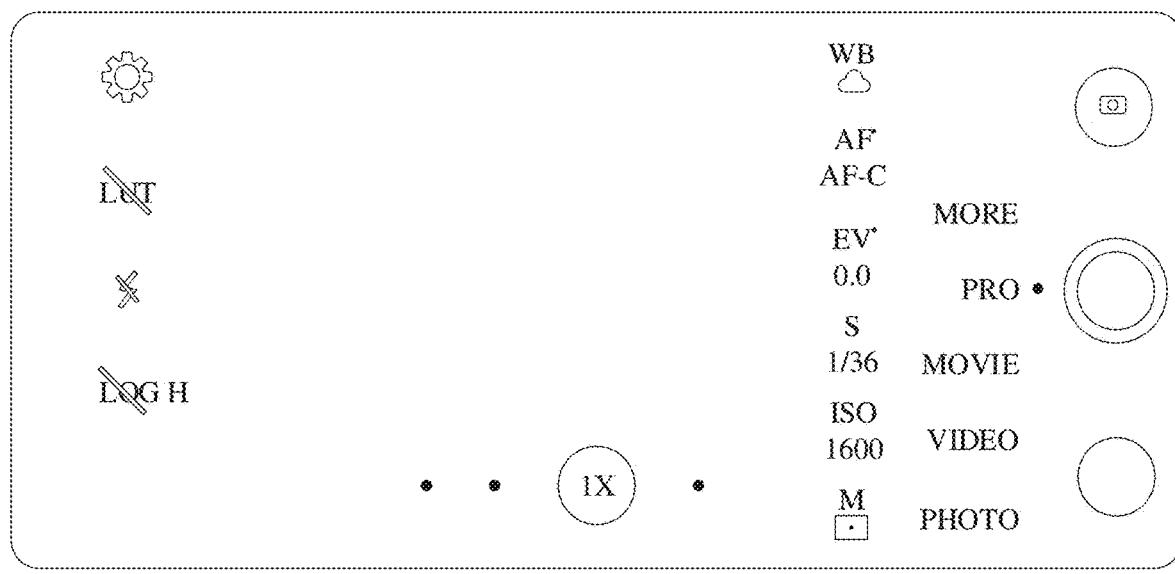
FIG. 12 is a schematic diagram of a user interface in a professional mode according to an embodiment of this application.

The electronic device 100 may detect a touch operation of the user acting on the professional mode option, to display the professional mode. As shown in FIG. 12, when the electronic device is in the professional mode, functional options that may be included in a user interface are, for example, a LOG option, a flash option, a LUT option, and a setting option. In addition, the user interface further includes a parameter adjustment option, for example, a photometric M option, an ISO option, a shutter S option, an exposure value EV option, a focusing manner AF option, and a white balance WB option.

In some embodiments, the electronic device 100 may start the professional mode by default after the camera application is started. This application is not limited thereto. The electronic device 100 may alternatively start the professional mode in another manner. For example, the electronic device 100 may alternatively start the professional mode based on a voice instruction of a user, which is not limited in this embodiment of this application.

The electronic device 100 may detect a user operation of the user acting on the LOG option. In response to the operation, the electronic device 100 enables the LOG function. The LOG function can apply a logarithmic function to an exposure curve, to keep details of a highlight and shadow of an image captured by a camera to the maximum extent, so that a finally presented previewed image has a low saturation. A video recorded by using the LOG function is referred to as a LOG video.

In the professional mode, the electronic device 100 may record a video to which a video style template is added, may alternatively add a video style template to a video to which no video style template is added, or record a LOG video after enabling the LOG function, and then add a video style template to the LOG video. In this way, the electronic device 100 may not only adjust a display effect of an image before recording a video, but also adjust a display effect of a recorded video after completing video recording, increasing flexibility and freedom of image adjustment.

As shown in FIG. 10, an embodiment of this application further provides a video processing apparatus. The apparatus includes: a video storage resolution determining module, configured to determine one video storage resolution from a plurality of video storage resolutions; a video style determining module, configured to determine one video style template among a plurality of video style templates, where each video style template is corresponding to a preset three-dimensional look up table LUT; a video obtaining module, configured to obtain a video shot through a camera, where the video is corresponding to a preset resolution; a snapping module 31, configured to snap a corresponding image in the video as a snapped image in response to a snapping instruction; a first LOG-based processing module, configured to process the video by using a logarithm LOG curve corresponding to a current photosensitivity ISO of the camera, to obtain a LOG video; and a second LOG-based processing module, configured to process the snapped image by using the LOG curve corresponding to the current ISO of the camera lens, to obtain a LOG-based snapped image; a first LUT-based processing module, configured to convert an LOG video from a preset resolution to a determined video storage resolution if the determined video storage resolution is less than the preset resolution, and process the LOG video based on a LUT corresponding to the determined video style template, to obtain a video corresponding to the determined video style template; and a second LUT-based processing module, configured to process the LOG-based snapped image based on the LUT corresponding to the determined video style template, to obtain a snapped image corresponding to the determined video style template, where a resolution of the snapped image is equal to the preset resolution.

The foregoing video processing method may be applied to the video processing apparatus. A specific process and principle are not described herein again. The first LOG-based processing module may be specifically the GTM module 26 in the foregoing embodiment, and the first LUT-based processing module may be specifically a combination of the scaling module 27 and the LUT-based processing module 29 in the foregoing embodiment. The scaling module 27 is configured to perform a process of converting the LOG video from the preset resolution to the determined video storage resolution. The LUT-based processing module 29 is configured to process the LOG video based on the LUT corresponding to the determined video style template, to obtain the video corresponding to the determined video style template. The foregoing GTM module 26 may be multiplexed as the second LOG-based processing module. During video recording and image snapping, the GTM module 26 may perform step 104 and step 106 in different time, and the second LUT-based processing module may be a LUT-based snapping processing module 32.

In a possible implementation, the first LUT-based processing module is further configured to process the LOG video based on the LUT corresponding to the determined video style template if the determined video storage resolution is equal to the preset resolution, to obtain the video corresponding to the determined video style template.

In a possible implementation, the video processing apparatus further includes: a conversion module, configured to convert the LOG video from a LOG video in RGB color space to a LOG video in YUV color space, where the conversion module may be specifically located between the scaling module 27 and the YUV denoising module 28 in FIG. 10, and the conversion module is not shown in FIG. 10; and a YUV denoising module 28, configured to perform YUV denoising on the LOG video in the YUV color space, to obtain a denoised LOG video.

In a possible implementation, the video processing apparatus further includes: a first conversion module, configured to convert the denoised LOG video from the LOG video in the YUV color space to the LOG video in the RGB color space, where the first conversion module may be located between the YUV denoising module 28 and the LUT-based processing module 29 in FIG. 10; and a second conversion module, configured to convert a video that is in the RGB color space and that is corresponding to the determined video style template into a video in the YUV color space, where the second conversion module may be located between the LUT-based processing module 29 and a process of storing the video 1 in FIG. 10. The first conversion module and the second conversion module are not shown in FIG. 10.

In a possible implementation, in the first video processing procedure, a process of converting the video shot through the camera into a video in wide-gamut color space, a process of processing the video in the wide-gamut color space by using a logarithm curve LOG, to obtain a LOG video, and a process of processing the LOG video based on a LUT corresponding to the determined video style template, to obtain a video corresponding to the determined video style template are performed. The video processing method further includes a second video processing procedure. The second video processing procedure includes: a process of converting the video shot through the camera lens into a video in wide-gamut color space, a process of processing the video in the wide-gamut color space by using a logarithm curve LOG, to obtain a LOG video, and a process of processing the LOG video based on a LUT corresponding to the determined video style template, to obtain a video corresponding to the determined video style template are performed. The video processing method further includes: a first storing module, configured to store the video corresponding to the determined video style template in the first video processing procedure; and a preview module, configured to preview the video corresponding to the determined video style template in the second video processing procedure.

In a possible implementation, a video resolution in the second video processing procedure is less than a resolution of the snapped image.

In a possible implementation, the video obtaining module is specifically configured to alternately obtain a video image of a first exposure frame and a video image of a second exposure frame, where a time for which the video image of a first exposure frame is exposed is greater than a time for which the video image of a second exposure frame is exposed.

The snapping module is specifically configured to: use the video image of a second exposure frame as a reference frame if a moving object is detected in a current video; or use the video image of a first exposure frame as a reference frame if no moving object is detected in a current video; and fuse a plurality of frames of video images into the snapped image based on the reference frame.

In a possible implementation, the video processing apparatus further includes a bit conversion module. The bit conversion module is configured to convert the LOG-based snapped image from 10-bit image data to 8-bit image data.

It should be understood that division of the video processing apparatus into modules is merely logical function division. The modules may be all or partially integrated into a physical entity or may be physically separated in actual implementation. In addition, all of the modules may be implemented in a form of software invoked by using a processing element or may be implemented in a form of hardware. Alternatively, some modules may be implemented in a form of software invoked by using the processing element, and some modules are implemented in a form of hardware. For example, any one of the video storage resolution determining module, the video style determining module, the video obtaining module, the snapping module, the first LOG-based processing module, the second LOG-based processing module, the first LUT-based processing module, and the second LUT-based processing module may be an independent processing element or may be integrated into the video processing apparatus, for example, integrated into a chip of the video processing apparatus, or may be stored in a memory of the video processing apparatus in a form of a program. Functions of the foregoing modules may be called and performed by a processing element of the video processing apparatus. Implementations of other modules are similar thereto. In addition, all or some of these modules may be integrated together or implemented independently. The processing element herein may be an integrated circuit having a signal processing capability. During implementation, steps of the foregoing method or the foregoing modules may be completed through an integrated logic circuit of the hardware in the processor element or an instruction in the form of software.

For example, the modules including the video storage resolution determining module, the video style determining module, the video obtaining module, the snapping module, the first LOG-based processing module, the second LOG-based processing module, the first LUT-based processing module, and the second LUT-based processing module may be one or more integrated circuits configured to implement the foregoing method, such as one or more application-specific integrated circuits (Application-Specific Integrated Circuit, ASIC), one or more microprocessors (digital signal processor, DSP), or one or more field programmable gate arrays (Field Programmable Gate Array, FPGA). For another example, when one of the foregoing modules is implemented in a form of a program invoked by the processing component, the processing component may be a general processor, for example, a central processing unit (Central Processing Unit, CPU) or another processor that may invoke the program. For another example, the modules may be integrated in a form of a system-on-a-chip (system-on-a-chip, SOC) for implementation.

An embodiment of this application further provides a video processing apparatus. The video processing apparatus includes: a processor and a memory. The memory is configured to store at least one instruction. The instruction is loaded and executed by the processor to implement the video processing method in any one of the foregoing embodiments.

The foregoing video processing method may be applied to the video processing apparatus. A specific process and principle are not described herein again.

A quantity of processors may be one or more. The processor and memory may be connected via a bus in another manner. The memory, as a non-transitory computer-readable storage medium, may be configured to store a non-transitory software program, a non-transitory computer-executable program, and a module, such as program instructions/module corresponding to the video processing apparatus in this embodiment of this application. The processor runs the non-transitory software program, instructions, and the module that are stored in the memory, to execute various functional applications and data processing, that is, implement a method in any one of the foregoing method embodiments. The memory may include a program storage area and a data storage area. The program storage area may store an operating system, an application required for at least one function, necessary data, and the like. In addition, the memory may include a high speed random access memory, and may also include a non-transient memory, such as at least one magnetic disk storage device, a flash memory, or another non-transient solid state storage device.

As shown in FIG. 1, an embodiment of this application further provides an electronic device. The electronic device includes a camera 193 and the foregoing video processing apparatus. The video processing apparatus includes a processor 110.

A specific principle and working process of the video processing apparatus are the same as a specific principle and working process in foregoing embodiments. The details are not described herein again. The electronic device may be any product or component having a video shooting function, such as a mobile phone, a television, a tablet computer, a watch, a wristband, or the like.

An embodiment of this application further provides a computer-readable storage medium. The computer-readable storage medium stores a computer program. When the computer program is run on a computer, the computer is enabled to perform the video processing method in any one of the foregoing embodiments.

In the foregoing embodiments, all or some of the foregoing embodiments may be implemented by using software, hardware, firmware, or any combination thereof. When the software is used for implementing the embodiments, all or a part of the embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk)), or the like.

In embodiments of this application, "at least one" means one or more, and "a plurality" means two or more. A term "and/or" describes an association relationship between associated objects and indicates that three relationships may exist. For example, A and/or B may indicate the following three cases: Only A exists, both A and B exist, and only B exists, where A and B may be singular or plural. The character "/" generally indicates an "or" relationship between associated objects before and after the character. "at least one of the following" or a similar expression thereof means any combination of these items, including a single item or any combination of a plurality of items. For example, at least one of a, b, and c may represent a, b, c, a and b, a and c, b and c, or a, b, and c, a, b, and c may be single or multiple.

The foregoing descriptions are merely exemplary embodiments of this application, but are not intended to limit this application. Persons skilled in the art understand that this application may have various modifications and variations. Any modification, equivalent replacement, and improvement made without departing from the spirit and principle of this application shall fall within the protection scope of this application.

What is claimed is:

1. A video processing method, comprising:
   determining one video storage resolution from a plurality of video storage resolutions;
   determining one video style template among a plurality of video style templates, wherein each video style template is corresponding to a preset look up table (LUT);
   obtaining a video through a camera, wherein the video is corresponding to a preset resolution;
   snapping a corresponding image in the video as a snapped image in response to a snapping instruction;
   processing the video by using a logarithm (LOG) curve corresponding to a current photosensitivity ISO of the camera, to obtain a LOG video;
   processing the snapped image by using the LOG curve corresponding to the current photosensitivity ISO of the camera, to obtain a LOG-based snapped image;
   converting the LOG video from the preset resolution to a determined video storage resolution if the determined video storage resolution is less than the preset resolution, and processing the LOG video based on a LUT corresponding to the determined video style template, to obtain a video corresponding to the determined video style template; and
   processing the LOG-based snapped image based on the LUT corresponding to the determined video style template, to obtain a snapped image corresponding to the determined video style template, wherein a resolution of the snapped image is equal to the preset resolution.

2. The video processing method according to claim 1, further comprising:
   processing the LOG video based on the LUT corresponding to the determined video style template if the determined video storage resolution is equal to the preset resolution, to obtain a video corresponding to the determined video style template.

3. The video processing method according to claim 1, wherein
   the obtaining a video shot through a camera comprises:
   alternately obtaining a video image of a first exposure frame and a video image of a second exposure frame, wherein a time for which the video image of a first exposure frame is exposed is greater than a time for which the video image of a second exposure frame is exposed; and
   a process of snapping a corresponding image in the video as a snapped image in response to a snapping instruction comprises:
   using the video image of a second exposure frame as a reference frame if a moving object is detected in a current video; or
   using the video image of a first exposure frame as a reference frame if no moving object is detected in a current video; and
   fusing a plurality of frames of video images into the snapped image based on the reference frame.

4. The video processing method according to claim 1, wherein
   before a process of processing the LOG-based snapped image based on the LUT corresponding to the determined video style template, to obtain a snapped image corresponding to the determined video style template, the method further comprises:
   converting the LOG-based snapped image from 10-bit image data to 8-bit image data.

5. The video processing method according to claim 1, wherein
   in a first video processing procedure, a process of processing the video by using a logarithm (LOG) curve corresponding to a current photosensitivity ISO of the camera, to obtain a LOG video, and a process of processing the LOG video based on a LUT corresponding to the determined video style template, to obtain a video corresponding to the determined video style template are performed;
   the video processing method further comprises a second video processing procedure, and the second video processing procedure comprises:
   processing the video through the camera, by using a logarithm (LOG) curve, to obtain a LOG video; and
   processing the LOG video based on a LUT corresponding to the determined video style template, to obtain a video corresponding to the determined video style template; and
   the video processing method further comprises:
   storing the video corresponding to the determined video style template in the first video processing procedure; and
   previewing the video corresponding to the determined video style template in the second video processing procedure.

6. The video processing method according to claim 5, wherein
   a video resolution in the second video processing procedure is less than a resolution of the snapped image.

7. An electronic device, comprising:
   a camera, a processor and a memory, wherein the memory is configured to store at least one instruction that, when executed by the processor, causes the electronic device to perform video processing operations comprising:
   determining one video storage resolution from a plurality of video storage resolutions;
   determining one video style template among a plurality of video style templates, wherein each video style template is corresponding to a preset look up table (LUT);
   obtaining a video through a camera, wherein the video is corresponding to a preset resolution;
   snapping a corresponding image in the video as a snapped image in response to a snapping instruction;
   processing the video by using a logarithm (LOG) curve corresponding to a current photosensitivity ISO of the camera, to obtain a LOG video;
   processing the snapped image by using the LOG curve corresponding to the current photosensitivity ISO of the camera, to obtain a LOG-based snapped image;

converting the LOG video from the preset resolution to a determined video storage resolution if the determined video storage resolution is less than the preset resolution, and processing the LOG video based on a LUT corresponding to the determined video style template, to obtain a video corresponding to the determined video style template; and processing the LOG-based snapped image based on the LUT corresponding to the determined video style template, to obtain a snapped image corresponding to the determined video style template, wherein a resolution of the snapped image is equal to the preset resolution.

8. A non-transitory, computer-readable storage medium, wherein the computer-readable storage medium stores a computer program, and when the computer program is run on a computer, the computer is enabled to perform video processing operations comprising:

determining one video storage resolution from a plurality of video storage resolutions;

determining one video style template among a plurality of video style templates, wherein each video style template is corresponding to a preset look up table (LUT);

obtaining a video through a camera, wherein the video is corresponding to a preset resolution;

snapping a corresponding image in the video as a snapped image in response to a snapping instruction;

processing the video by using a logarithm (LOG) curve corresponding to a current photosensitivity ISO of the camera, to obtain a LOG video;

processing the snapped image by using the LOG curve corresponding to the current photosensitivity ISO of the camera, to obtain a LOG-based snapped image;

converting the LOG video from the preset resolution to a determined video storage resolution if the determined video storage resolution is less than the preset resolution, and processing the LOG video based on a LUT corresponding to the determined video style template, to obtain a video corresponding to the determined video style template; and processing the LOG-based snapped image based on the LUT corresponding to the determined video style template, to obtain a snapped image corresponding to the determined video style template, wherein a resolution of the snapped image is equal to the preset resolution.

9. The electronic device according to claim 7, further comprising:

processing the LOG video based on the LUT corresponding to the determined video style template if the determined video storage resolution is equal to the preset resolution, to obtain a video corresponding to the determined video style template.

10. The electronic device according to claim 7, wherein the obtaining a video shot-through a camera comprises:

alternately obtaining a video image of a first exposure frame and a video image of a second exposure frame, wherein a time for which the video image of a first exposure frame is exposed is greater than a time for which the video image of a second exposure frame is exposed; and a process of snapping a corresponding image in the video as a snapped image in response to a snapping instruction comprises:

using the video image of a second exposure frame as a reference frame if a moving object is detected in a current video; or using the video image of a first exposure frame as a reference frame if no moving object is detected in a current video; and fusing a plurality of frames of video images into the snapped image based on the reference frame.

11. The electronic device according to claim 7, wherein before a process of processing the LOG-based snapped image based on the LUT corresponding to the determined video style template, to obtain a snapped image corresponding to the determined video style template, the video processing operations further comprise:

converting the LOG-based snapped image from 10-bit image data to 8-bit image data.

12. The electronic device according to claim 7, wherein in a first video processing procedure, a process of processing the video by using a logarithm (LOG) curve corresponding to a current photosensitivity ISO of the camera, to obtain a LOG video, and a process of processing the LOG video based on a LUT corresponding to the determined video style template, to obtain a video corresponding to the determined video style template are performed;

the video processing operations further comprise a second video processing procedure, and the second video processing procedure comprises:

processing the video through the camera, by using a logarithm (LOG) curve, to obtain a LOG video; and processing the LOG video based on a LUT corresponding to the determined video style template, to obtain a video corresponding to the determined video style template; and the video processing operations further comprise:

storing the video corresponding to the determined video style template in the first video processing procedure; and previewing the video corresponding to the determined video style template in the second video processing procedure.

13. The electronic device according to claim 12, wherein a video resolution in the second video processing procedure is less than a resolution of the snapped image.

* * * * *

UNITED STATES PATENT AND TRADEMARK OFFICE
CERTIFICATE OF CORRECTION

PATENT NO. : 12,425,535 B2
APPLICATION NO. : 18/262809
DATED : September 23, 2025
INVENTOR(S) : Hantao Cui et al.

Page 1 of 1

It is certified that error appears in the above-identified patent and that said Letters Patent is hereby corrected as shown below:

On the Title Page

Change "(71) Applicant: HONOR DEVICE CO., LTD., Guangdong (CN)" to --(71) Applicant: HONOR DEVICE CO., LTD., Shenzhen (CN)--;

In the Specification

Column 1, Line 28, change "tilter" to --filter--;

Column 5, Line 66, change "camera lens" to --camera--;

Column 9, Lines 43 and 44, change "deta_val-ueB_E" to --delta_val-ueB_E--;

In the Claims

Column 23, Claim 3, Line 3, change "video shot" to --video--; and

Column 25, Claim 10, Line 2, change "shot-through" to --through--.

Signed and Sealed this
Twenty-first Day of October, 2025

John A. Squires
*Director of the United States Patent and Trademark Office*